July 2, 1935.   H. MUELLER   2,006,558
TEMPERATURE RESPONSIVE APPARATUS
Filed Dec. 18, 1934
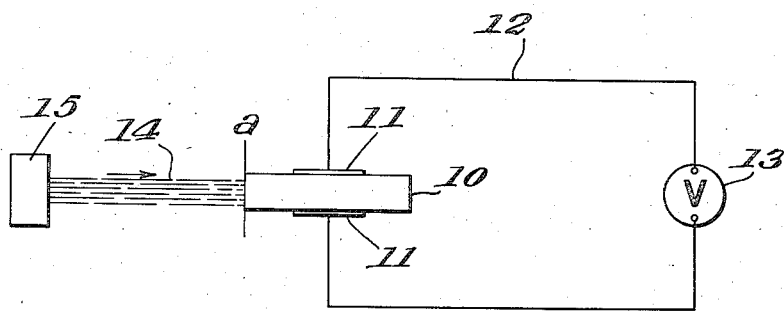
Inventor:
Hans Mueller.
By Dike, Calver & Gray.
Attorneys.

UNITED STATES PATENT OFFICE 2,006,558

TEMPERATURE RESPONSIVE APPARATUS

Hans Mueller, Brookline, Mass., assignor to Massachusetts Institute of Technology, Cambridge, Mass., a corporation of Massachusetts Application December 18, 1934, Serial No. 758,147

5 Claims. (Cl. 73—32)

This invention relates to a means for detecting, indicating, and measuring changes in temperature and has for its objects to provide an easily operated apparatus whereby very small changes in temperature can be detected and indicated at any desired point, either adjacent to or remote from the point where such changes occur, and which can also be employed, in a manner similar to a thermo-couple, to develop relatively high electric potentials as the result of relatively small changes in temperature.

The invention is based on the discovery that if a crystal of Rochelle salt (which crystallizes in accordance with the orthorhombic system) be included in an electric circuit between two electrodes, with its $a$ axis disposed across the electrodes, i. e., in the direction of the flow of current in the circuit, and the temperature of the crystal changed, as by heating or cooling, an electric potential is generated in the circuit. Experiments have shown that the potential developed varies as the square of the difference in temperature. The system is very responsive to even slight changes in temperature, a change of a very small fraction (as small as one twentieth) of a degree centigrade resulting in a potential which can be detected by a suitable instrument, and a change of 5° C., being sufficient to cause a potential which will produce a spark.

The accompanying drawing is a diagrammatic view of a simple form of apparatus in which the invention may be embodied and by which it may be practiced, although it will be understood that this is merely illustrative, and that the invention, as defined by the claims hereunto appended, may be otherwise embodied and practiced without departure from its spirit and scope.

In the drawing, 10 denotes a crystal of Rochelle salt which may be either a complete crystal or a portion of such a crystal cut to a convenient size and shape. The crystal 10 is interposed between two electrodes 11 with its $a$ axis crossing said electrodes or disposed transverse to their planes, as indicated. It is important that the contact between the crystal and the electrodes be as nearly perfect as possible, and to this end the opposite faces of the crystal are preferably polished and the electrodes made of tinfoil and cemented to said surface by a thin coating of Canadian balsam. Graphite electrodes can be used if desired. The electrodes 11 are connected in an electric circuit 12 including an electrometer 13 or equivalent instrument capable of indicating and measuring electric potentials.

With the apparatus thus arranged, even slight changes of temperature in the crystal 10 will result in setting up in the circuit 12 an electric potential which will be indicated by the instrument 13, the potential being substantially proportional to the square of the change in temperature. The apparatus can therefore be used for many of the purposes of a thermocouple but is much simpler and more responsive to slight changes in temperature than the ordinary thermocouple unless very elaborate and delicate appliances be employed in the latter. It can also be employed as a thermometer to register changes of temperature in closed spaces or regions not conveniently accessible for direct observation, since the crystal with its electrodes can be positioned in such space or region and the instrument 13 located at some remote point where it can be conveniently read. It can further be used for many of the purposes of a photoelectric cell, since if a beam of radiant heat 14, or a stream of heated air or other fluid, be projected from a suitable source 15 upon the crystal 10, any interruption or interception of said beam or stream will result in a drop in the temperature of the crystal and a consequent change in the potential of the circuit which can be utilized in a variety of ways. These and many other uses and advantages of the invention will, however, be obvious without further discussion in detail.

I claim:

1. An apparatus for generating an electric potential in an electric circuit which comprises a circuit, a crystal of Rochelle salt electrically connected therein and adapted to be subjected to changes in temperature.

2. A temperature measuring device comprising an electric circuit having included therein a pair of electrodes and an interposed crystal of Rochelle salt, and means for indicating changes of potential in said circuit.

3. A temperature measuring device comprising an electric circuit having included therein a pair of electrodes and an interposed crystal of Rochelle salt disposed with its $a$ axis in the direction of the flow of current in said circuit, and means for indicating changes of potential in said circuit.

4. A temperature measuring device comprising an electric circuit having included therein a crystal of Rochelle salt having opposite polished surfaces and tinfoil electrodes cemented to said surfaces, and means for indicating changes of potential in said circuit.

5. An apparatus for detecting changes in temperature which comprises a circuit, a crystal of Rochelle salt electrically connected therein and adapted to be subjected to the changes in temperature to be detected and means for indicating changes of potential in said circuit.

HANS MUELLER